(12) United States Patent
Butsch et al.

(10) Patent No.: US 6,902,394 B2
(45) Date of Patent: Jun. 7, 2005

(54) APPARATUS FOR AIDING THE REMOVAL OF AN ADHESIVELY COATED WEB FROM A ROTATING ROLL

(75) Inventors: William J. Butsch, Harrison, OH (US); John William Toussant, West Chester, OH (US)

(73) Assignee: The Procter & Gamble Company, Cincinnati, OH (US)

(*) Notice: Subject to any disclaimer, the term of this patent is extended or adjusted under 35 U.S.C. 154(b) by 0 days.

(21) Appl. No.: 10/655,800

(22) Filed: Sep. 5, 2003

(65) Prior Publication Data

US 2004/0058294 A1 Mar. 25, 2004

Related U.S. Application Data

(62) Division of application No. 10/047,355, filed on Jan. 14, 2002, now Pat. No. 6,652,273.

(51) Int. Cl.$^7$ .................................................. F27B 9/28
(52) U.S. Cl. ............................... 432/60; 432/8; 492/46; 219/470; 101/32; 156/247
(58) Field of Search ...................... 425/436 R; 156/247; 432/8, 59, 60, 228, 236; 101/32; 264/167, 171.3, 286; 492/46; 219/469, 470

(56) References Cited

U.S. PATENT DOCUMENTS

| | | |
|---|---|---|
| 3,239,367 A | 3/1966 | Demeter |
| 3,941,558 A | 3/1976 | Takiguchi |
| 4,261,286 A | 4/1981 | Kupfer |
| 4,461,095 A | 7/1984 | Lehtinen |
| 4,805,554 A | 2/1989 | McIntyre |
| 4,971,555 A | 11/1990 | Calamara |
| 5,058,496 A | 10/1991 | Wittkopf |
| 5,079,817 A | 1/1992 | Anstotz et al. |
| 5,114,337 A | 5/1992 | Yamazaki |
| 5,157,446 A | 10/1992 | Kusaka |
| 5,212,975 A | 5/1993 | Ginzburg |
| 5,291,666 A | 3/1994 | Babinsky et al. |
| 5,465,661 A | 11/1995 | White |
| 5,799,411 A | 9/1998 | Schiel |
| 5,916,409 A | 6/1999 | Mosburger |
| 6,074,192 A * | 6/2000 | Mikkelsen .................. 425/327 |
| 6,142,003 A | 11/2000 | Plociennik et al. |
| 6,193,918 B1 | 2/2001 | McGuire et al. |
| 6,256,903 B1 | 7/2001 | Rudd |

FOREIGN PATENT DOCUMENTS

| | | |
|---|---|---|
| CH | 223 764 | 10/1942 |
| DE | 318 938 C | 2/1920 |
| DE | 39 42 101 A1 | 6/1990 |
| DE | 198 42 746 A1 | 3/2000 |
| GB | 955 826 A | 4/1964 |
| WO | WO 03/035371 A1 | 5/2003 |

OTHER PUBLICATIONS

PCT International Search Report; PCT/US03/01019; date of mailing May 20, 2003.

* cited by examiner

Primary Examiner—Gregory Wilson
(74) Attorney, Agent, or Firm—Peter D. Meyer; David M. Weirich

(57) ABSTRACT

An apparatus for aiding the removal of an adhesively coated web disposed upon the surface of a rotating roll is disclosed. The apparatus includes a movable belt disposed about at least a portion of the surface of the roll and defining a contact region. The belt has a temperature that is different from the temperature of the roll so that as the adhesively coated web passes between the surface of the roll and the belt within the contact region, the web is cooled.

12 Claims, 2 Drawing Sheets

APPARATUS FOR AIDING THE REMOVAL OF AN ADHESIVELY COATED WEB FROM A ROTATING ROLL

CROSS REFERENCE TO RELATED APPLICATION

This application is a divisional of U.S. application Ser. No. 10/047,355, filed Jan. 14, 2002, now U.S. Pat. No. 6,652,273.

FIELD OF THE INVENTION

The present invention relates to processes and equipment for controlling and/or adjusting the temperature of equipment used in the manufacture of a film, web or other articles that are typically manufactured in a high speed, continuous manner.

BACKGROUND OF THE INVENTION

During manufacturing processes, and more typically during high speed manufacturing processes, rolls and/or belts are often used to guide articles or materials and/or to perform certain operations that can affect the properties of the materials or articles being manufactured. For example, rolls and/or belts may be used to calender, emboss, heat, cool, tension, direct, apply glue, ink or other substances, etc. to materials or articles during manufacturing or converting processes. Typically, when rolls or belts are used in conjunction with the manufacture or converting of materials or articles in a continuous process, the material or article is in contact with the roll throughout only a portion of the roll's rotation or the belt through only a portion of its path. For certain operations, it may be desirable for the material or articles being processed to reach or maintain a certain temperature range while in contact the roll through one portion of its rotation (or in the use of a belt, a portion of its path) and a different temperature when in contact with the roll through a different portion of its rotation. Alternatively, it may be desirable for one or more of the rolls and/or belts to be heated or cooled to a certain temperature range through a certain portion of its rotation or path and heated or cooled to another temperature range along a different portion of its rotation or path. However, controlling the temperature of the material being processed or the rolls and/or belts themselves can be very complicated and costly and is very difficult to achieve with current technology, especially at high speeds.

Current techniques for cooling rolls used during manufacture include passing fluid through the roll to control the temperature of the roll, applying air, steam or water to the circumference of the roll and contacting an idler roll to the manufacturing roll to add or remove heat from the surface of the manufacturing roll. Examples of such methods are disclosed in U.S. Pat. No. 4,805,554 issued to McIntyre; U.S. Pat. No. 5,058,496 issued to Wittkopf; U.S. Pat. No. 5,212,975 issued to Ginzburg; U.S. Pat. No. 5,799,411 Scheil and U.S. Pat. No. 6,256,903 issued to Rudd. However, techniques focusing on convective cooling have significant shortcomings in that convective cooling cannot transfer heat as efficiently as conduction, thereby limiting production rates. Further, the use of fugitive fluid for heating or cooling is often undesirable due to the inherent recovery and hygiene difficulties. With respect to the use of a roll contacting another roll to provide heat exchange, such methods are relatively inefficient because duration of the heating or cooling of the circumference of the roll being heated or cooled is limited by the nip between the rolls. The present invention overcomes these disadvantages by providing the capability to conductively chill a greater portion of a roll's surface. Furthermore, this invention provides the capability to provide supplemental vacuum forces to assist in the removal of the web/adhesive structure from the roil's surface coincident with the temperature reduction.

Accordingly, it would be desirable to provide a cost effective method and/or apparatus for controlling the surface temperature of a belt as it moves along its path. It would also be desirable to provide a cost effective method and/or apparatus for controlling the surface temperature of a roll as it rotates about its axis. Further, it would be desirable to provide an apparatus and/or method of controlling the temperature of a material and/or article being manufactured or converted using a roll or belt, wherein the temperature of the material and/or article is controlled while passing through a given portion of the roll's rotation about its axis or the belt's movement along its path. Further, it would be desirable to have an apparatus and/or method of providing zone temperature control of a roll or belt or a material being processed in an operation employing rolls or belts that can be used with or in place of current roll or belt technology. It would also be desirable to provide an improved process and apparatus for providing zone temperature control of a roll, belt or a material being processed in an operation employing rolls or belts that can be employed at high speeds and/or in continuous operations.

All documents cited herein are, in relevant part, incorporated herein by reference. The citation of any document is not to be construed as an admission that it is prior art with respect to the present invention.

SUMMARY OF THE INVENTION

The method and apparatus of the present invention provide a unique solution to the problems of the prior art by using a belt to modify the temperature of a manufacturing roll. For example, the method and apparatus of the present invention may be used to zone control the temperature of a rotating roll. In one embodiment, the apparatus may include a roll having a surface at a first temperature, the roll capable of rotating about an axis; and a belt disposed adjacent at least a portion of the surface of the roll and contacting the surface of the roll in a contact region, the belt having a second temperature that is different from the first temperature, wherein the belt affects a temperature change in at least a portion of the surface of the roll in the contact region as the roll is rotated.

One method for zone controlling the temperature of a rotating roll according to the present invention includes the following steps: (a) providing a roll having an axis and a surface at a first temperature; (b) providing a belt disposed adjacent at least a portion of the surface of the roll; (c) heating or cooling the belt to a second temperature that is different from the first temperature; (d) directly or indirectly contacting the belt with the surface of the roll in a contact region, (e) rotating the roll while in contact with the belt such that the belt affects a temperature change in at least a portion of the surface of the roll in the contact region as the roll is rotated.

Alternative methods and apparatuses to perform the methods are contemplated and described in more detail in the following sections of this specification.

BRIEF DESCRIPTION OF THE DRAWINGS

While the specification concludes with claims which particularly point out and distinctly claim the present invention, it is believed that the present invention will be better understood from the following description of preferred embodiments, taken in conjunction with the accompanying drawings, in which like reference numerals identify identical elements and wherein:

DETAILED DESCRIPTION OF THE INVENTION

Figure 1:
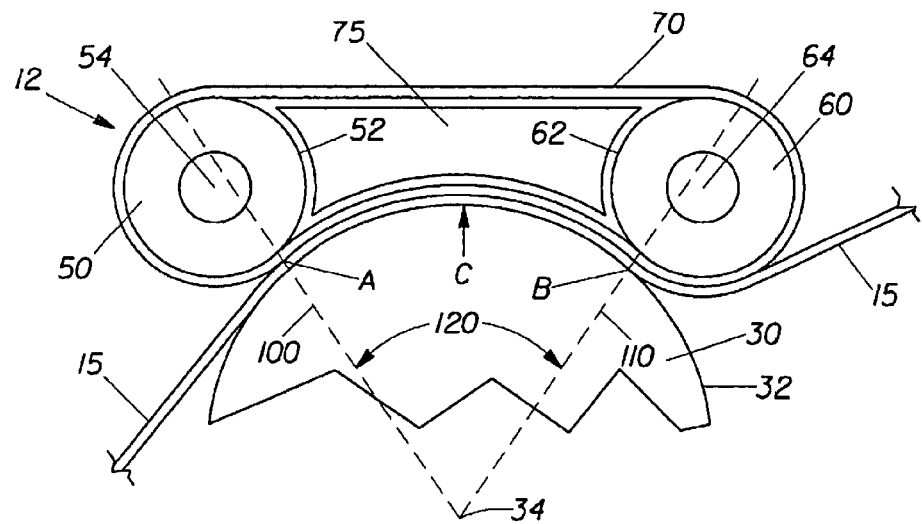
FIG. 1 is a schematic illustration of one embodiment of the apparatus according to the present invention.

The present invention relates to a method and apparatus for controlling and/or adjusting the temperature of equipment, such as rolls and/or belts, used in the manufacture of a film, web or other articles that are typically manufactured in a high speed, continuous manner. However, it should be understood that the method and apparatus of the present invention may also be applicable to non-continuous manufacturing processes and apparatuses that are used therein as well as processes and equipment that do not operate at high speeds.

It is well known in the art that during manufacturing processes, and more typically during high speed manufacturing processes, rolls (or rollers) and/or belts are often used to guide articles or materials and/or to perform certain operations that can affect the properties of the materials or articles being manufactured. As used herein, the terms "roll", "rolls", "roller" or "rollers" refer to generally cylindrically shaped devices that are configured to rotate about an axis. Such rolls or rollers typically provide a surface against which the article or material being processed will be directed for at least some period of time. In continuous processes, the material or article being processed is generally disposed against the surface of the rolls for only a portion of the roll's rotation before the material or article is removed from contact with the surface of the roll and directed to another apparatus or processing step. As used herein, the terms "belt" or "belts" refer to a continuous band of material configured to move in a predetermined path. Such belts typically provide a surface against which the article or material being processed will be directed for at least some period of time. In continuous processes, the material or article being processed is generally disposed against the surface of the belts for only a portion of the belt's rotation before the material or article is removed from contact with the surface of the belt and directed to another apparatus or processing step (in order to simplify the disclosure of the present invention and to reduce repetition, the following discussion will generally be directed to the use of rolls for providing the working surface of the apparatus, however, it should be understood that belts and other equipment can be used and that the apparatus and method of the present invention is intended to include such alternatives, without limitation). As noted above, rolls are used for many purposes during typical manufacturing processes, including, but not limited to calendering, embossing, heating, cooling, tensioning, directing, and applying glue, ink or other substances to the materials or articles being processed. For certain operations, it may be desirable for the material or articles being processed to reach or maintain a certain temperature range while in contact with the roll through one portion of its rotation and a different temperature when in contact with the roll through a different portion of its rotation. Alternatively, it may be desirable for one or more of the rolls to be heated or cooled to a certain temperature range through a certain portion of its rotation and heated or cooled to another temperature range along a different portion of its rotation. However, providing zone controlled temperature of the material being processed or the rolls themselves is very difficult to achieve with conventional technology, especially at high speeds. Accordingly, it has been discovered that a relatively inexpensive apparatus and method can be used to provide such zone temperature control for materials and/or articles that are processed using one or more rolls.

FIG. 1 is a schematic illustration of one relatively simple embodiment of the apparatus and method according to the present invention. As shown in the figure, web 15 is passed over a roll, in this case roll 30. In this embodiment, the web 15 is moving continuously from the lower left-hand corner of the figure to the upper right-hand corner of the figure as it is processed.

In the embodiment shown in FIG. 1, the web 15 is contacted with the surface 32 of the roll 30. (It should be understood that the phrase "in contact" as used herein, refers to direct or indirect contact between two surfaces, materials or articles. Thus, a web is considered in contact with a roll when directly touching the surface of the roll, as well as when the web is not directly touching the surface of the roll, but is touching a material that is in turn directly touching the roll. Further, a belt or roll is deemed to be in contact with another belt, roll or other piece of equipment if it is in direct contact or if it is in contact with a web or article which is in turn in contact with the other piece of equipment.) After the web is placed in contact with the surface 32 of the roll 30, the web 15 moves with the roll 30 throughout a portion of the roll's rotation about its axis 34. Thus, the web 15 is wrapped around a portion of the roll 30 defined by a contact angle 120. Prior to being removed from the surface 32 of the roll 30, the web 15 is passed between the roll 30 and a temperature modifying apparatus 12, as shown in FIG. 1.

The temperature modifying apparatus 12, shown in FIG. 1, includes a belt 70 that rotates continuously about rolls 50 and 60 having surfaces 52 and 62 and axes 54 and 64, respectively. The temperature modifying apparatus 12 is preferably positioned adjacent the surface of a roll, such the surface 32 of roll 30, used in the manufacture, converting or other processing of a particular material or article. Preferably, the rolls 50 and 60 of the temperature modifying apparatus 12 are disposed such that the belt 70 is in contact with the working surface 32 of the manufacturing roll 30 for at least a portion of the circumference of the manufacturing roll's 30 surface 32. As shown in FIG. 1, the belt contact region C is located between the point A at which the belt 70 first contacts the roll 30 and the point B at which the belt 70 last contacts the roll 30 during normal operation of the apparatus. The contact region C can also be described In terms of the angle between a pair of lines 100 and 110 extending radially from the axis 34 of the manufacturing roll 30 through the points A and B, respectively. One benefit of the apparatus of the present invention is that the contact region C can be greater than a typical nip between two contacting rolls. In certain embodiments, it may be preferred that the contact region C be at least about 5 degrees of the surface 32 of the roll 30. In other embodiments, the contact region C may be at least about 10 degrees of the surface 32 of the roll 30 or may be at least about 15 degrees of the surface 32 of the roll 30. Accordingly, the use of a belt 70 in the temperature modifying apparatus 12 of the present invention may provide for more effective and/or efficient heat transfer as opposed to simply contacting two rolls of different temperatures.

The contact angle 120, and thus, the contact region C, can be increased or decreased by moving the belt 70 toward or away from the axis 34 of the manufacturing roll 30. Alternatively, the contact angle 120 can be increased or decreased by adjusting the distance between the rolls 50 and 60 that hold the belt 70 against the surface 32 of the manufacturing roll 30. This type of adjustment is one useful way to increase or decrease the amount of temperature adjustment that can be made using the apparatus 12 of the present invention. These and other adjustment means could be especially useful at start up of the machine to compensate for temperature changes as temperatures are reaching equilibrium. The adjustment may also be useful to compensate for intentional changes in line speed.

As the web 15 passes between the manufacturing roll 30 and the belt 70, the belt 70 can heat or cool the web 15 and/or the surface 32 of the manufacturing roll 30. For example, if the manufacturing roll 30 is running at ambient temperature, the belt 70 can be heated above the ambient temperature or cooled to a temperature below the ambient temperature such that as the belt 70 passes through the contact region C, the belt 70 heats or cools the web 15 and/or the surface 32 of the manufacturing roll 30. In other embodiments, the manufacturing roll 30 may be heated or cooled to provide a temperature differential between the belt 70 and the roll 30. In certain embodiments, it may be preferred that the difference between the temperature of the belt and the temperature of the surface of the roll 30 be at least about 50° F. (about 28° C.) or greater than about 60° F. (about 34° C.), although other temperature differences may be desirable for different uses. In any case, the method and apparatus of the present invention provide an effective means for controlling the temperature of a particular region of the surface of a manufacturing roll 30 or a material that is placed in contact with such a roll during processing.

The belt 70 can be of any size, style and can be made of any suitable materials for the desired processing step in which the belt is utilized. In certain preferred embodiments, the belt 70 may be made from metal, rubber, polymeric resins (e.g. Nylon) or a combination of materials. Metal belts may be desirable due to their strength and heat capacity. Suitable metals for use in the belt considering heat properties and cost are, for example, steel (generally having a heat capacity or specific heat of about 0.12 cal/gm ° C.), Aluminum (generally having a heat capacity of about 0.2 cal/gm ° C.), stainless steel (generally having a heat capacity of about 0.103 cal/gm ° C.), and alloys of these and other metals or combinations thereof (generally having a heat capacity in the range of about 0.10 to about 0.23 cal/gm ° C.). Alternatively, the belt may be made from a polymer that is reinforced with and/or filled with high heat capacity materials. Suitable high heat capacity low cost mineral fillers may include, for example, alumina (having a heat capacity of about 0.2 cal/gm ° C.), limestone (having a heat capacity of about 0.217 cal/gm ° C.), silica (having a heat capacity of about 0.316 cal/gm ° C.), gypsum (having a heat capacity of about 0.259 cal/gm ° C.), and most metals or metal oxides in powder or filament form or combinations thereof. In certain preferred embodiments, where the belt includes a filler material, the filler may have a heat capacity or specific heat of at least about 0.09 cal/gm ° C. In other embodiments, the heat capacity of the filler may be at least about 0.15 cal/gm ° C or at least about 0.20 cal/gm ° C.

The belt 70 can be impermeable or permeable of have regions of differing permeability. One advantage of a permeable or semi-permeable belt is that air, water or other fluids can be passed through the belt 70 as a means to transfer heat to or from the belt 70. Further, a permeable belt can provide openings through which a vacuum can be provided to help remove the material or article being manufactured from the manufacturing roll 30. Perforated metal belts and metal screens are generally suitable for use with the present invention. An advantage of metal screens is that they can be configured to have different strands made of different materials. Thus, for example, it may be desirable to provide relatively strong strands in the machine direction and relatively high heat capacity strands in the cross machine direction, or vice versa.

The belt 70 can be generally flat or may have some structure. The belt 70 may also be used to provide some properties to the article or web being manufactured, such as a three-dimensional structure, or may be used to add or remove materials from the web (e.g. printing, adding adhesive, etc.). Further, the belt 70 may be of any suitable width. Accordingly, the belt 70 can be the same width as the manufacturing roll 30 or the web 15, or can be larger or smaller than either. If the belt 70 is smaller in width than the web 15 or manufacturing roll 30, the heating or cooling effects of the belt 70 can be directed to only a portion of web 15 or roll, if so desired. Alternatively, only a portion of the belt 70 may be heated or cooled to give a similar effect. In yet another embodiment, two or more belts may be used and can be spaced apart and/or made from different materials. In any case, such embodiments may provide for zone heating or cooling of the roll 30 or web 15 in the cross-machine direction. Alternatively, for machine directional control of heating or cooling, the belt 70 may be intermittently heated or cooled or may be made from materials that produce or retain different amounts of heat energy. Thus, intermittent or continuous patterns of heating or cooling can be achieved in both the machine and cross-machine directions, if desired.

The rolls, including the manufacturing rolls 20, 30 and 40, as well as the belt rolls 50 and 60 can be of any size and be made of any suitable material. In many known processes, for example, in the manufacture of paper products, films and nonwoven materials, rolls are often made of metal to prolong their life. However, the rolls may be made from or coated with materials such as rubber, synthetic rubber, polymers, plastic, wood, ceramics, glass or any other material suitable for the particular use desired. Further, all or a portion of the surface of any of the rolls may be covered or coated with materials that alter or otherwise provide some benefit to the roll for its intended use. For example, steel rolls are often coated with Teflon, silicone, rubber, synthetic rubber or other polymers to alter the characteristics of the surface of the roll.

The roll or rolls may be solid or hollow and may be rotated by any known means, including, but not limited to electric motors, belts, gears, etc. In certain embodiments, the roll or rolls are not actively rotated by a source dedicated to the rotation of the rolls, but are rotated due to contact with other rolls that are rotating or belts that are in contact with a portion of the roll's surface. In other embodiments, the material or article being processed provides the means for rotating one or more of the rolls. Any of the rolls can be heated or cooled internally or externally and the surface of the rolls can take on any desired configuration. In some embodiments, the surface of the rolls may be smooth, while in other embodiments, the surface of at least some of the rolls may have raised or depressed regions. The surface of the rolls may be continuous or may include any number of openings or passages in their surface or body for any desired purpose. Thus, for example, the surface of a roll may be entirely or partially screen-like, having a number of openings through which air can pass. In yet other embodiments, the cross-section of the roll may not be circular, but may take on any suitable shape such as an oval, an octagon or an irregular shape including any number of curves or linear portions.

The temperature modifying apparatus 12 may also include a means or device for controlling the temperature of the belt 70. The belt temperature control device can use any known means for heating or cooling a surface or structure, including, but not limited to heat exchangers or other heating or cooling devices that use hot or cool air, radiant heating, friction, evaporation, light, magnetism, radio waves, microwaves, laser light, refrigeration, or any combination of these and other heating and cooling methods. In one embodiment, the rolls 50 and/or 60 may be cooled or heated to cool or heat the belt 70. In another embodiment, as shown in FIG. 1, the temperature modifying apparatus 12 may include a vacuum plenum 75. The vacuum plenum 75 pulls air across the belt 70 to cool or heat the belt 70 as it rotates. In other embodiments, the vacuum plenum 75 may include a heating element or a cooling element to further heat or cool the air before it passes over the belt 70. Further, when the belt is permeable to air, the vacuum may pull air through some or all of the openings in the belt. This may provide for more rapid and/or even heating or cooling of the belt 70.

The temperature modifying apparatus 12 may also be useful to help remove the web 15 from the roll 30 without distorting the web 15 or otherwise negatively impacting the structure of the web 15. For example, if the temperature modifying apparatus 12 includes an air pervious belt and a vacuum, the apparatus may be configured such that the vacuum pulls the web 15 from the roll 30. This may provide for a more gentle removal of the web 15 from the roll 30. (Although not wishing to be bound by theory, it is believed that the vacuum can provide for better removal because it spreads the forces over a larger area of the web and thus, reduces localized stress concentrations. Further, a removal force generally perpendicular to the machine direction and the plane of the web can help reduce the machine direction forces otherwise needed to strip the web from the roll.) This can be useful when the web 15 is glued or otherwise stuck to or has a tendency to stick to the roll 30, especially if the removal force is provided at the time when the adhesive is cooled or heated to be less tacky. Further, cooling of the web 15 may increase its strength and allow for more aggressive removal operations. Other means for improving removal of the web 15 from the roll 30 may include static electricity or coatings or materials that provide some affinity between the belt 70 and the web 15. In any case, it may be desirable to remove the web 15 from the roll, while the web 15 is still in contact with the belt 70. Otherwise, the cooling or other characteristics of the belt 70 may be lost as the web 15 continues to be disposed adjacent the surface of the roll beyond the contact region C.

Although the temperature modifying apparatus 12 of the present invention has been described in terms of a device including a belt rotating continuously about at least two rolls, the apparatus can be modified to include different elements, if desired. For example, the apparatus 12 may include non-rotating bars in addition to or in place of one or more of the rolls 50 and 60. The bars can be used to direct and/or tension the belt 70. Further, the apparatus 12 may include a belt support to help keep the belt 70 from sagging and/or to help direct and/or adjust the belt 70 against a surface, such as the surface 32 of the manufacturing roll 30.

The apparatus 12 of the present invention could also be provided with belt tensioning and/or belt tracking systems, as desired for a particular operation. In yet other embodiments of the present invention, the temperature modifying apparatus 12 may be used to heat or cool the surface of manufacturing equipment other than rolls, such as, for example, planar and curved moving and non-moving surfaces, belts, shafts and the like.

Figure 3:
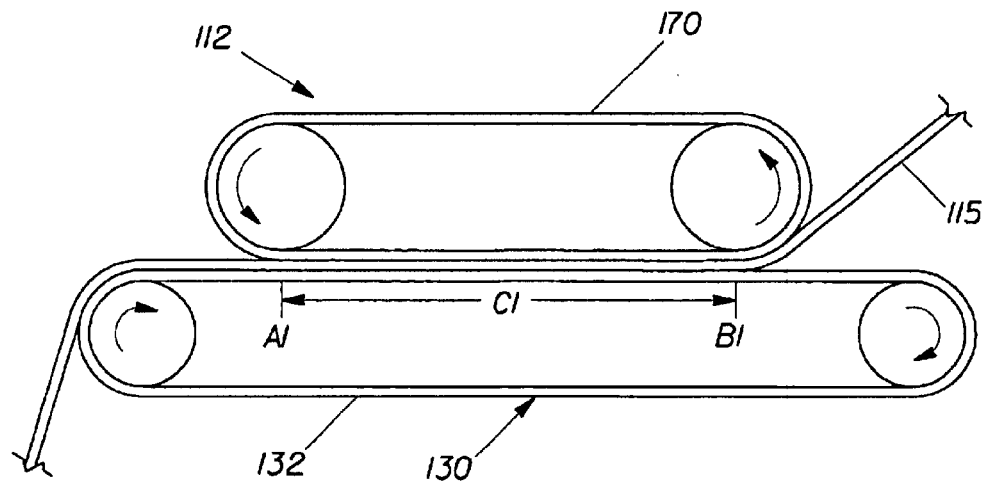
FIG. 3 is a schematic illustration of an alternative embodiment of the present invention.

FIG. 3 depicts an alternative embodiment of the present invention wherein the temperature modification apparatus 112 includes a belt 170 that is disposed adjacent at least a portion of manufacturing belt 130. Web 115 is shown to pass between the belt 170 and the manufacturing belt 130, however, embodiments are contemplated wherein the material or article being manufactured or converted does not pass between the temperature modifying apparatus 112 and the manufacturing belt 130. In any case, as in the other embodiments described herein, the belt 170 of the temperature modifying apparatus 112 preferably heats or cools at least a portion of the surface 132 of the manufacturing belt 130, typically in contact region C1 located between the point A1 where the belt 170 first touches the manufacturing belt 130 during normal operation and point B1 where the belt 170 last touches the manufacturing belt 130. The temperature modifying apparatus 112 may also include means for facilitating the removal of the web 115 from the surface 132 of the manufacturing belt 130 such as those described herein with respect to other embodiments of the present invention.

Exemplary Embodiment

In one exemplary embodiment, the method and apparatus of the present invention may be used during the manufacture of a sheet material that includes a thin layer of pressure-sensitive adhesive in certain predetermined locations, such as the food and storage wraps described in detail in commonly-assigned patents, namely, Hamilton et al, U.S. Pat. No. 5,662,758, entitled "Composite Material Releasably Sealable to a Target Surface When Pressed Thereagainst and Method of Making", Hamilton et al., U.S. Pat. No. 5,871,607, entitled "Material Having A Substance Protected by Deformable Standoffs and Method of Making". McGuire et al., U.S. Pat. No. 5,965,235, entitled "Three-Dimensional, Nesting-Resistant Sheet Materials and Method and Apparatus for Making Same", and Hamilton et al., U.S. Pat. No. 6,194,062, entitled "Improved Storage Wrap Materials", and McGuire et al., U.S. Pat. No. 6,193,918, entitled "High Speed Embossing and Adhesive Printing Process and Apparatus, and Hamilton et al. U.S. Ser. No. 10/003,900, filed Oct. 25, 2001 entitled "Storage Wrap Material", and Toussant et al., U.S. Ser. No. 10/150,258, filed Oct. 25, 2001 entitled "High Speed Embossing and Adhesive Printing Process and Apparatus".

For such applications, it has been found to be advantageous to include the temperature modifying apparatus 12 of the present invention to help increase the speed and reliability of the process. Specifically, as described in more detail below, adhesive is applied to a film by means of a roll. The method and apparatus of the present invention can be employed to help cool, solidify and/or deactivate the adhesive such that the adhesive coated film can be more easily removed from the adhesive application roll.

Figure 2:
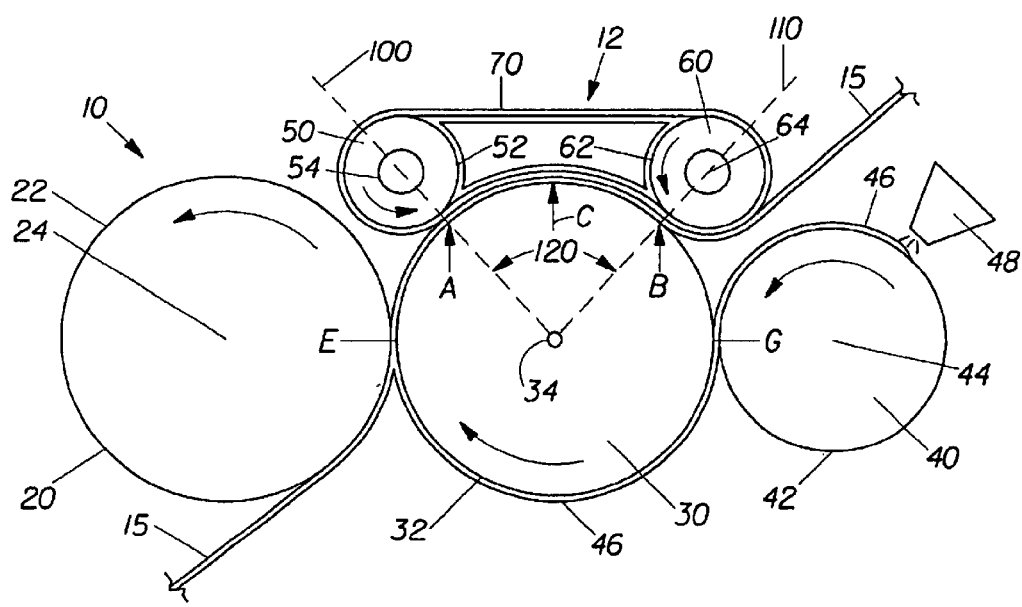
FIG. 2 is a schematic illustration of an alternative embodiment of the apparatus according to the present invention.

FIG. 2 illustrates in schematic form, a high speed embossing process and high speed embossing apparatus 10 including the temperature modifying apparatus 12 of the present invention. (Although this example is described in terms of an embossed web, the present invention is equally applicable to non-embossed webs.) The high speed embossing apparatus 10 comprises first and second embossing rolls 20 and 30. The first and second embossing rolls 20 and 30 have a complementary (i.e., matched) embossing pattern which interlocks to emboss the pattern onto a web 15 of material passed therebetween. The embossing roll provided with pockets and raised lands is generally referred to as the female embossing roll. The embossing roll with raised nubs and recessed lands is generally referred to as the male embossing roll. It will be understood that either the first or second embossing roll 20 and 30 can be the male or female roll. As a non-limiting example, if the first embossing roll 20 is determined to be the female roll, then the second embossing roll 30 should be the male roll. It may be preferred that one of the embossing rolls have a release material, such as a silicone-based or a fluorocarbon-based material (i.e. FEP), disposed thereon. The release material generally has a high release characteristic to facilitate removal of the embossed final product from the embossing roll.

As shown in FIG. 2, the high speed embossing apparatus 10 may further include an adhesive application roll 40 (having axis 44) that supplies a metered amount of adhesive 46 to the second embossing roll 30 from an adhesive supply. The surface 42 of the adhesive application roll 40 is preferably conformable to the surface 32 of the second embossing roll 30. Alternatively, the surface 32 of the second embossing roll 30 may be conformable to the surface 42 of the adhesive application roll 40. This helps ensure that the entire surface of the embossing roll 30 is coated with the adhesive 46. More specifically, with reference to FIG. 2, an adhesive 46 is extruded onto the surface 42 of the adhesive application roll 40 via a slot die 48. However, it would be known to one of skill in the art that other methods to supply an adhesive 40 to the adhesive application roll 40 can be used. Once the adhesive is applied to the adhesive application roll 40, it is transferred by contact to the surface 32 of the second embossing roll 30.

In one preferred embodiment, adhesive 46 is applied only to the land areas of the second embossing roll 30. This can be accomplished by carefully controlling the interaction between second embossing roll 30 and the adhesive application roll 40 so that the adhesive application roll 40 does not press the adhesive 46 into the recesses around or pockets between the lands of second embossing roll 30. For this reason, it may be desirable for the second embossing roll 30 and the adhesive application roll 40 to have matched surface speeds. Deposition of adhesive 40 exclusively onto the lands of the second embossing roll 30 prevents adhesive 40 from being transferred onto the non-recessed regions of the embossments in the finished embossed adhesive coated web 15.

For exemplary purposes only, adhesive application roll 40 can be a rubber coated steel roll. The nip between adhesive application roll 40 and the second embossing roll 30 may be controlled in the machine direction with precision wedge blocks. It is believed that a rubber coating can be utilized to both protect the coating on the second embossing roll 30 from damage and also allow the adhesive application roll 40 to be very lightly pressed against the second embossing roll 30 so the deflection of the rubber compensates for the actual runout of the second embossing roll 30 and the adhesive application roll 40. Alternatively, the second embossing roll 30 may exhibit conformable characteristics and the adhesive application roll 40 may exhibit non-conformable characteristics. This can help the adhesive 40 to be applied evenly on the lands of second embossing roll 30. However, it would be known to one of skill in the art that either the second embossing roll 30 or the adhesive application roll 40 can be any arrangement of conformable/non-conformable as long as the adhesive 46 is provided in a topically efficacious manner.

As shown in FIG. 2, web 15 is directed into contact with the surface 22 of the first embossing roll 20 (having axis 24). Alternatively, web 15 is directed into contact with the surface 32 of the first embossing roll 30 (having axis 34). The web 15 is then embossed between the nip of the first embossing roll 20 and the second embossing roll 30, shown in FIG. 2 as nip E. The embossed web 15 is adhered to the surface 32 of the second embossing roll 30 as the roll 30 rotates from the nip E to the contact region C. The surface 32 of the second embossing roll 30 preferably has release characteristics. That is, it is configured or treated to allow the adhesive 46 to stick to the web 15 and not the surface of the roll 30 when the web 15 is removed from the roll 30. The release characteristics and the adhesive properties should be carefully balanced to provide the best combination of adhesion and release. An exemplary release characteristic would be a coating which allows a hot (typically about 250–350° F. (121–177° C.)) adhesive to transfer to the second embossing roll 30 and yet allows the embossed adhesive coated web 15 to release from the second embossing roll 30 at a lower temperature. If the release characteristic promotes too little adhesion, the adhesive will not transfer from the adhesive application roll 40 to the second embossing roll 30. However, if the release characteristic promotes too much adhesion, the final adhesive coated web 15 may not be able to be removed from the surface 32 of the second embossing roll 30 without tearing, stretching or otherwise deforming the web of sheet material 15.

In one exemplary embodiment, in order to improve adhesive transfer from the adhesive application roll 40 to the second embossing roll 30, the surface 32 of the embossing roll 30 is heated. The surface may be heated to any desired temperature, but it has been found that for the embodiment described herein, a temperature of between about 250° F. and about 350° F. (about 121° C. to about 177° C.) works well. Any type of heater known to those of skill in the art can be used to heat the embossing roll 30, including heaters that produce heat by means of radiation, conduction, convection and combinations thereof. In one embodiment, as is described in more detail below, a temperature modifying apparatus 12 of the type described herein may be used to heat the surface 32 of the roll. Once the adhesive 46 is applied to the web 15, the interface between the adhesive 46 and the second embossing roll 30 is preferably cooled by the temperature modifying apparatus 12 of the present invention to allow for easier and more effective removal of the adhesively coated web 15 from the roll 30. Thus, in a preferred embodiment, the temperature of the interface between the web 15 and the surface 32 of second embossing roll 30 is lower in the region where the belt 70 contacts the second embossing roll 30 than the temperature of the interface between the adhesive 46 and the surface 32 of second embossing roll 30 at the glue transfer nip G. In sum, a temperature differential should exist between the point of adhesive pick-up, glue transfer nip G, and the point where the embossed adhesive coated web 15 is removed from the second embossing roll 30. In one preferred embodiment, it has been found that it is preferable that the interface between the web 15 and the surface 32 of the roll 30 in the contact region C be less than about 180° F. (about 82° C.), more preferably less than about 140° F. (about 60° C.) or less than about 100° F. (about 38° C.). In other embodiments, it may be desirable to get the temperature of the web 15 to be within a certain range in the contact region C. For example, it may be desirable for the temperature of the web 15 to be less than about 100° F. (about 38° C.) by the time the web 15 is removed from the roll. However, the exact temperature of the web 15 and/or the exact temperature at each of the regions and the desired temperature differential will vary depending on the adhesive and/or film used.

Figure 4:
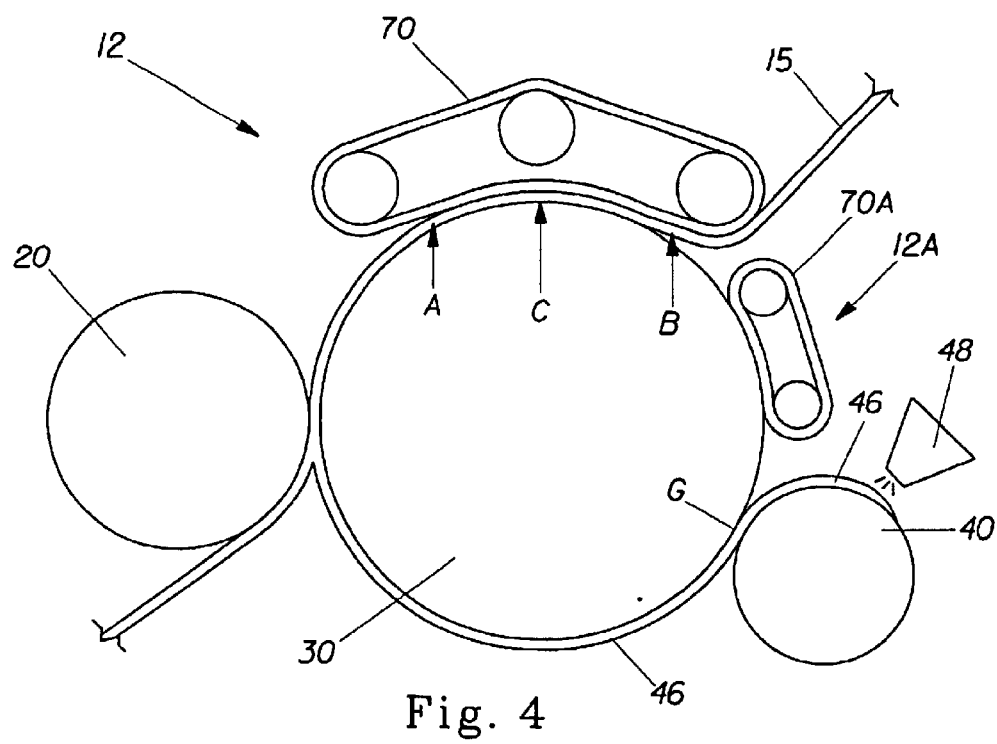
FIG. 4 is a schematic illustration of an alternative embodiment of the present invention.

In one alternative embodiment, as shown in FIG. 4, a temperature modifying apparatus 12A of the type described herein can be located adjacent the second embossing roll 30 between the point B where the web 15 is removed from the roll 30 and point G where the glue is applied to the second embossing roll 30. The belt 70A of the apparatus 12A can be heated to a temperature above the temperature of the surface 32 of the roll 30 such that the belt 70 heats the surface 32 of the roll 30 to a temperature suitable for the adhesive 46 to transfer from the adhesive application roll 40 to the second embossing roll 30. In such embodiments, it may be desirable to cool the second embossing roll 30 internally, by means of the temperature modifying apparatus 12 of the present invention or by any other cooling means or combination of cooling means to facilitate removal of the adhesively coated web 15 from the second embossing roll 30 at point B.

While particular embodiments and/or individual features of the present invention have been illustrated and described, it would be obvious to those skilled in the art that various other changes and modifications can be made without departing from the spirit and scope of the invention. Further, it should be apparent that all combinations of such embodiments and features are possible and can result in preferred executions of the invention. Therefore, the appended claims are intended to cover all such changes and modifications that are within the scope of this invention.

What is claimed is:

1. An apparatus for aiding the removal of an adhesively coated web disposed upon a surface of a rotating roll, said roll having a first temperature, the apparatus comprising:

a moveable belt disposed about at least a portion of the surface of the roll and defining a contact region, the belt having a second temperature that is different from the first temperature such that as the adhesively coated web passes between the surface of the roll and the belt within said contact region, the adhesively coated web is cooled to a third temperature that is different from the first temperature.

2. The apparatus of claim 1 wherein the belt is air permeable.

3. The apparatus of claim 1 further including a means for cooling the belt.

4. The apparatus of claim 1 further including a vacuum plenum disposed adjacent at least a portion of the belt.

5. The apparatus of claim 4 wherein the vacuum plenum cools the belt by passing air over at least a portion of the belt.

6. The apparatus of claim 4 wherein the vacuum plenum provides a vacuum that can be used to help remove a web that is passed between the belt and the roll from the surface of the roll.

7. The apparatus of claim 1 wherein the contact region is at least about 10 degrees of the surface of the roll.

8. The apparatus of claim 1 wherein the roll has a first width and the belt has a second width that is less than the first width.

9. The apparatus of claim 1 wherein the difference between the first temperature and the second temperature is at least about 28° C.

10. The apparatus of claim 1 wherein the belt is manufactured from a material, said material comprising a metal selected from the group consisting of steel, alloys of steel, Aluminum, alloys of Aluminum, stainless steel, alloys of stainless steel, and combinations thereof.

11. The apparatus of claim 1 wherein the belt includes a filler including one or more of the following: alumina, limestone, silica, gypsum, metals or metal oxides in powder or filament form.

12. The apparatus of claim 11 wherein the filler has a heat capacity of at least about 0.09 cal/gm ° C.

* * * * *

UNITED STATES PATENT AND TRADEMARK OFFICE
CERTIFICATE OF CORRECTION

PATENT NO. : 6,902,394 B2
DATED : June 7, 2005
INVENTOR(S) : Butsch et al.

It is certified that error appears in the above-identified patent and that said Letters Patent is hereby corrected as shown below:

Column 1,
Line 65, "beating" should be -- heating --.

Column 2,
Line 4, "roil's" should be -- roll's --.

Signed and Sealed this

Twenty-third Day of August, 2005

JON W. DUDAS
*Director of the United States Patent and Trademark Office*